United States Patent [19]

Rueb

[11] Patent Number: 5,757,500
[45] Date of Patent: *May 26, 1998

[54] CALIBRATION SYSTEM FOR LARGE TOOLING FIXTURES

[75] Inventor: Kurt Rueb, Kitchener, Canada

[73] Assignee: Virtek Vision Corp., Ontario, Canada

[*] Notice: The term of this patent shall not extend beyond the expiration date of Pat. No. 5,663,795.

[21] Appl. No.: 810,889

[22] Filed: Mar. 6, 1997

Related U.S. Application Data

[63] Continuation-in-part of Ser. No. 522,985, Sep. 7, 1995, Pat. No. 5,663,795.
[51] Int. Cl.$^6$ .................................................. G01B 11/14
[52] U.S. Cl. ........................................ 356/375; 356/243
[58] Field of Search .............................. 356/375, 376, 356/243

[56] References Cited

U.S. PATENT DOCUMENTS

| | | | |
|---|---|---|---|
| 4,396,945 | 8/1983 | DiMatteo et al. | 358/107 |
| 4,682,894 | 7/1987 | Schmidt et al. | 356/375 |
| 4,744,664 | 5/1988 | Offt et al. | 356/375 |
| 4,925,308 | 5/1990 | Stern et al. | 356/375 |
| 5,085,502 | 2/1992 | Womack et al. | 356/243 |
| 5,388,318 | 2/1995 | Petta | 29/407 |
| 5,396,331 | 3/1995 | Kitoh et al. | 356/376 |
| 5,530,548 | 6/1996 | Campbell et al. | 356/375 |

FOREIGN PATENT DOCUMENTS 1295707  2/1992  Canada.

*Primary Examiner*—Hoa Q. Pham
*Attorney, Agent, or Firm*—Howard & Howard

[57] ABSTRACT

A method for determining the position of a laser projector relative to a large tool includes the use of posts having several reference points. The rotating tool is preferably also provided with a plurality of reference points. At least two of the reference points are spaced by a known distance. By identifying the location of the reference points, a control for the system is able to calibrate where the reference points are relative to the laser projectors. In this way, the laser projector is able to calibrate itself relative to the reference points on the large tool. The invention improves upon the prior art in that the location of the reference points need not be fixed relative to the workpiece. Instead, the system will initially determine the position of the reference points based upon known distances between the reference points.

14 Claims, 1 Drawing Sheet

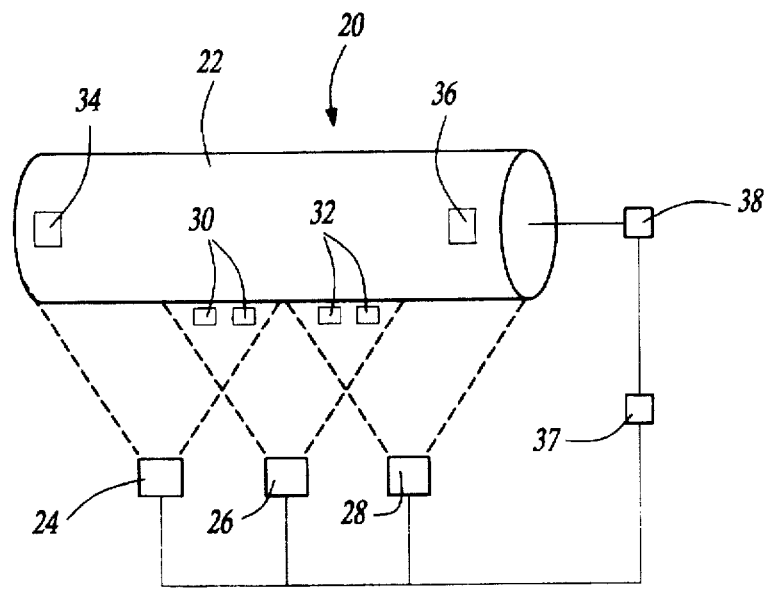
_Fig-1_
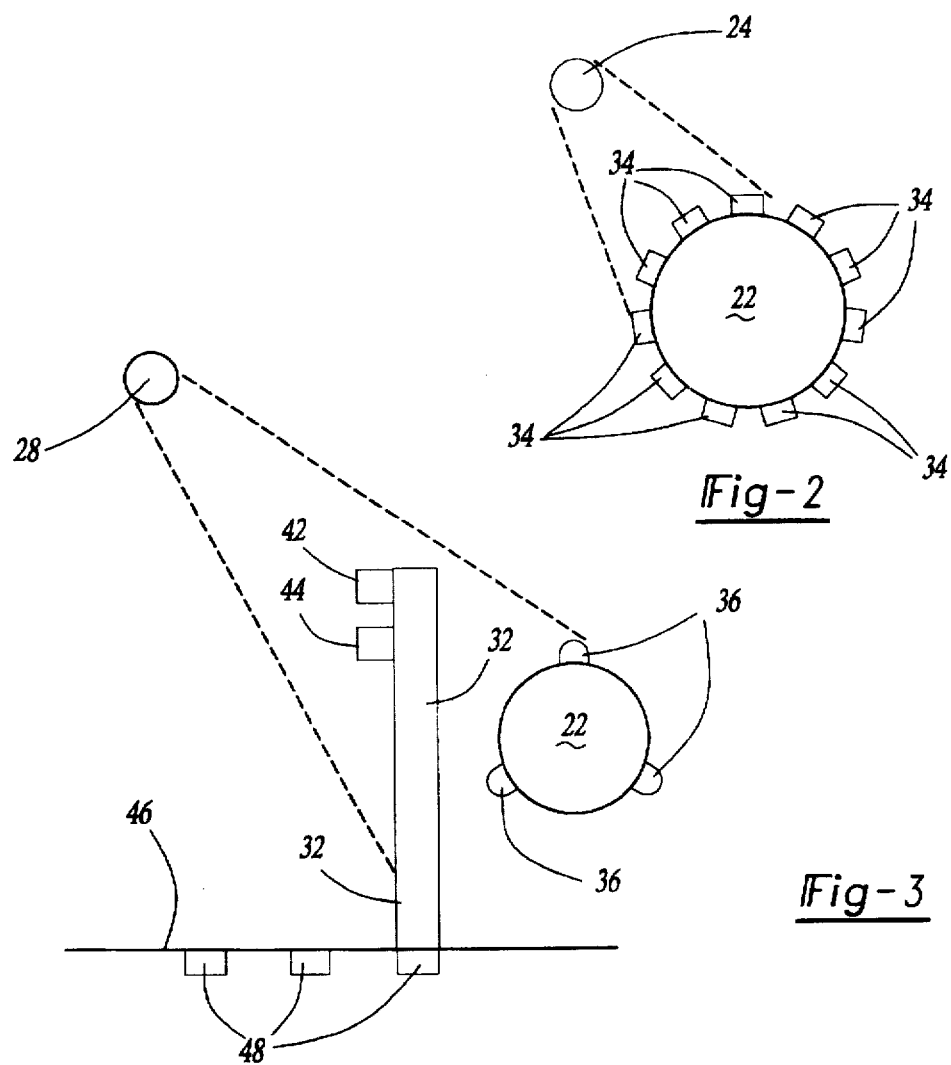
_Fig-2_
_Fig-3_

CALIBRATION SYSTEM FOR LARGE TOOLING FIXTURES

This application is a continuation in part of U.S. patent application Ser. No. 08/522,985 filed Sep. 7, 1995, now U.S. Pat. No. 5,663,795.

BACKGROUND OF THE INVENTION

This invention relates to a calibration system for calibrating the position of laser projectors relative to large tools.

Laser scanning systems are beginning to be utilized to assist in the positioning of workpieces on work surfaces. In one main example, laser scanners are replacing the use of templates to position plies in the construction of large vehicle bodies, such as airplane fuselages. Laser projectors are utilized to scan an image of the desired location of a ply on previously placed plies, or on a work surface. Laser projectors are also utilized to provide scanned laser images for positioning of other parts such as truss components, etc.

The use of a scanned laser image to provide an indication of where to place workpiece parts, such as plies, requires extreme accuracy in calibrating the position of the laser projector relative to the work surface. In the past, the systems have typically required the placement of several (typically six) reference points fixed on or about the work surface. As an example, reflectors or sensors have typically been placed in an approximate area where the ply will be placed. The laser identifies its location relative to these reference points. Since the points are at fixed locations relative to the work, the laser also knows where it is relative to the work. In systems for placing plies on airplane fuselages, this requirement of six fixed reference points has been somewhat constricting. In fact, the plies themselves and many of the tools utilized to attach the plies are very large. The reference points must be placed at locations where the plies will not cover the reference points, and such that the laser projector will be able to still direct a beam off of the reference points. When relatively large tools and plies have been utilized, the use of the fixed points has thus been somewhat difficult to achieve. Moreover, the fixed reference points require technicians to travel to the workplace and accurately place the reference points. This is also undesirable.

More recently, and in the parent application to this Application, a proposal has been made in which reference points can be placed at initially unknown locations about a workplace. The laser is able to determine the specific location of the unknown locations of the reference points since at least one variable is fixed. The system of the parent application utilizes two reference points which are spaced by a fixed distance. The system is able to calibrate its location in space and relative to the workpiece by determining the angular location of the unknown locations for the reference points. The known distance between the two reference points is then relied upon to fix the location of all reference points in space, and hence the location of the laser projector. This system has proven extremely valuable in simplifying the calibration of laser projectors, and in particular, for large tool applications.

SUMMARY OF THE INVENTION

The instant invention relates to the use of a laser projector calibration system that is particularly valuable for very large applications.

In one disclosed embodiment, the reference points are formed on large posts. The posts may be several feet high, and are mounted in the floor adjacent to a workplace, such as a large tool. The tool itself may carry two or more reference points spaced by known distances on the tool.

In one disclosed application, the tool is a large rotating tool utilized for placing plies on a fuselage body. The rotating tool has reference points spaced by a known distance at each end. The posts as described above are placed at locations spaced along the axial length of the rotating tool. Several projectors are preferably utilized. The projectors have a field of "vision" that allows each projector to at least direct its beam off of several reference points. Preferably, there are several central reference points that can be seen by both a central laser projector, and outer laser projectors. In one preferred embodiment, there are at least three laser projectors with one central and two outer laser projectors. The outer laser projectors can each direct a laser beam off of posts formed adjacent to that end, and a reference point fixed on the end of the tool. The central projector can see the posts associated with both outer projectors.

A control can correlate the information from each of the three projectors, and establish the position of the projectors relative to the posts, and the tool. In this way, the laser projector system is able to very accurately calibrate itself relative to the entire work system. The present invention thus easily and quickly calibrates the position of laser projectors relative to very large tools.

These and other features of the present invention can be best understood from the following specification and drawings, of which the following is a brief description.

BRIEF DESCRIPTION OF THE DRAWING

FIG. 1 is a schematic view of a system incorporating the present invention.

FIG. 2 is a side view of one portion of the system shown in FIG. 1.

FIG. 3 is a side view of another feature of the system shown in FIG. 1.

DETAILED DESCRIPTION OF A PREFERRED EMBODIMENT

An inventive system 20 is illustrated in FIG. 1 for use in calibrating laser projectors relative to a large rotating tool 22. Rotating tool 22 may be a very long cylindrical tool which rotates to apply plies of material to form airline bodies. The tool is often on the order of 30 feet long. In the past, it has been very difficult to calibrate the location of laser projectors relative to this size of tool.

The present invention utilizes three spaced laser projectors 24, 26 and 28. Reference posts 30 and 32 are also utilized. Posts 30 are placed adjacent one end of the tool 22 and posts 32 are placed adjacent the opposed end. Reference points 34 and 36 are fixed in the tool 22. The reference point 34 is placed adjacent the projector 24 end, while the reference point 36 is placed adjacent the projector 28 end. While only one point 34 and 36 is shown in this figure, as will be explained below a plurality of points 34 and 36 are preferably spaced about the surface of tool 22. The distance along tool 22 between the reference points 34 and 36 is known.

The range of vision for the projectors is shown by dotted line. Note that the projector 24 has both post 30 and the reference point 34 within its range of vision. The central projector 26 has posts 30 and 32 within its range of vision. The projector 28 has post 32 and reference point 36 within its range of vision. By correlating the information from the three projectors, a control 37 is able to determine the location of all three of the projectors relative to the posts 30 and 32, and reference points 34 and 36. The control 37 may also be provided with information about the rotational angle of the tool 22 from a motor 38 which rotates the tool. The system is able to accurately determine the rotated position of the reference points 34 and 36, posts 30, 32, and the laser projectors 24, 26 and 28.

Preferably, the laser projectors 24, 26 and 28 are placed at a position such that none of the reference points are directly forwardly of a projector. If a projector is directly forward of a reference point, it would be more difficult to determine the actual distance from the projector to the reference point, as there would be no angle involved.

As shown in FIG. 2, the post 30 and 32 preferably each have at least a pair of reflectors 42 and 44. As discussed in the parent application, and as known generally in the art, a laser beam from a projector, such as projector 28, is reflected off of the reflectors 42 and 44 and back to the laser projector. The laser projector can determine the location of the reference point 42 and 44 by studying the angles of the reflected light.

As further shown, a base 46 forwardly of the tool 22 may be formed with holes 48 to receive the posts. In this way, the post 32 can be placed in the approximate desired location relative to the tool 22. This will reduce the "search" time necessary for the laser projectors to initially identify the location of the posts 30 and 32.

As shown in FIG. 2, at one end of the tool, here the end with reference points 36, there are three reference point 36 spaced by approximately 120° about the circumference of tool 22. As shown in FIG. 3, there are several more reference points 34 spaced circumferentially about tool 22. The combined projection 24, 26 and 28 must always be able to see at least one reference point 34 and one associated reference point 36 to have the reference known distance between the two points. Further, the control may also determine the exact rotational angle of the tool 22 by three reference points 34 as shown in FIG. 3. The reference points 34 must be fixed at known circumferential distances, and by identifying the exact location of the points relative to each other the control may tell the exact rotational position of the tool 22. Further, as the tool 22 continues to rotate, monitoring the movement of the reference points 34 will also provide precise feedback and how much rotation has occurred. Although there are only three reference points 36, and several more than three reference points 34 shown, it should be understood that there may also be additional reference points 36.

Initially, the location of the reference posts and the reference points 34 and 36 are unknown relative to the projectors. The projectors 24, 26 and 28 then "search" for the reference points on the posts 30, 32 and reference points 34 and 36. The control can then determine the rotational angle of the tool. Once the relative locations of all of the reference points are determined, the control 37 can correlate all of the information and determine the location of the posts 30, 32, reference points 34 and 36, and the projectors 24, 26 and 28 relative to each other.

As shown, the reflective points 44 and 42 on the post 32 are preferably spaced by a known distance d. Similarly, the positions 34 and 36 are spaced by a known distance. The use of the known distances between identified reference points provides the control 37 with the ability to determine the exact location of all of the reference points relative to each other. That is, by combining the angle of incidence between a particular projector and the reference points, that can be seen by that projector, with the additional information provided by the known distance, the system is able to identically solve for the relative location of all of the points. In that way, the previously unknown location of the reference points can be solved. When that is known, the position of the lasers relative to those points can also be solved. The math equations utilized to calibrate or identify the plurality of reference point positions and projectors positions are known. As explained in greater detail in the parent application for this application, the known distance between two of the points allows a solution of the equations to calibrate the entire system.

If the tool is rotated, if a reference pole is moved, if the projector has moved, or upon initial setup, the location of the reference points and the projectors must be recalibrated. Once this has occurred, the system will know where the projector is relative to the tool, and its reference points.

A preferred embodiment of this invention has been disclosed, however, a worker of ordinary skill in the art would recognize that certain modifications would come within the scope of this invention. For that reason, the following claims should be studied to determine the true scope and content of this invention.

I claim:

1. A method of determining the location of a laser projector relative to a work surface comprising the steps of:
    (1) positioning a plurality of reference points at unknown locations relative to a workpiece with at least two points being spaced by a fixed known distance;
    (2) directing a laser beam from a laser projector to search for said reference points, and reflecting light from one of said reference points back to said laser projector;
    (3) repeating step (2) for subsequent reference points;
    (4) identifying the location of the reference points relative to each other, and identifying the position of said projector relative to said reference points by utilized said known distance.

2. A method as recited in claim 1, wherein said workpiece includes a large rotating tool.

3. A method as recited in claim 2, wherein said tool has reference points at opposed axial ends spaced by said known distance.

4. A method as recited in claim 3, wherein additional ones of said reference points are mounted on poles positioned adjacent said tool.

5. A method as recited in claim 4, wherein there are a plurality of projectors spaced along an axis of rotation of said tool.

6. A method as recited in claim 5, wherein there are outer ones of said projectors and a central one of said projector, said outer projectors each being able to see at least one of said reference points on said posts and one of said reference points on said tool, and said central projector being able to see reference points on posts that can be seen by each of said outer projectors, a control correlating information from all three of said projectors, and identifying the location of said reference points on said posts, said reference points on said tool, and then determine the relative position of all of said reference points, and said projectors.

7. A method as recited in claim 2, wherein there are several circumferentially spaced reference points located at, at least one end of said tool, such that at least one of said projectors can identify at least three reference points at said one end of said tool to determine the rotational position of said tool.

8. A laser scanning system comprising:
    (1) a laser projector system mounted adjacent to a work site;

(2) a plurality of reference points, said reference points being operable to send a signal to a control for said laser projection system when a beam from a laser projector associated with said laser projector system is directed onto said reference points at least some of said reference points being mounted on a post mounted adjacent said work site; and a tool mounted to perform work at said work site, said tool carrying at least two of said reference points spaced by a known distance.

9. A system as recited in claim 8, wherein said tool is a large rotating tool, and said at least two reference points are spaced by a known distance adjacent two ends spaced along an axis of rotation of said tool.

10. A system as recited in claim 9, wherein there are a plurality of reference points at each of said ends of said tool, said plurality of reference points at each of said ends being spaced circumferentially about said tool, such that upon rotation of said tool at least one of said reference points should be visible to a laser projector for said system.

11. A system as recited in claim 10, wherein at least one end of said tool there are at least three of said reference points which are visible to a laser projector for said system at any time such that a control can identify the rotational position of said tool.

12. A system as recited in claim 8, wherein said post is mounted within holes in a grid of available holes adjacent said work site.

13. A system for applying plies to a vehicle body comprising:

(1) a tool rotating about an axis of rotation, and a motor for rotating said tool, said tool being provided with reference points adjacent each end of said tool spaced along said axis of rotation;

(2) a laser projection system comprising at least three laser projectors spaced along said axis of rotation, and spaced away from said tool; and (3) posts carrying reference point mounted between said laser projectors and said tool, said posts each carrying at least two said reference points, said reference points on each of said posts being spaced by a known distance, such that by identifying the location of said reference points on said tool, and said reference points on said posts, a control for said laser projectors is able to calibrate the location of said laser projectors, and said reference points relative to each other.

14. A system as recited in claim 13, wherein at at least one end of said tool, there are a plurality of said reference points, such that a laser projector associated with said system is able to identify at least three of said reference points at any rotational position of said tool.

* * * * *